Sept 10, 1957 C. W. FRANK 2,806,087

STOPPING CIRCUIT FOR SELECTOR SWITCH

Filed Dec. 1, 1953

INVENTOR.
CHARLES W. FRANK

BY Wm. Walter Owen

ATTY.

2,806,087
Patented Sept. 10, 1957

2,806,087

STOPPING CIRCUIT FOR SELECTOR SWITCH

Charles W. Frank, Wheaton, Ill., assignor to General Telephone Laboratories, Incorporated, a corporation of Delaware Application December 1, 1953, Serial No. 395,397

3 Claims. (Cl. 179—18)

The present invention relates to automatic telephone and like electric selective systems and more particularly to an arrangment for preventing the occurrence of double connections to the same contact that may be simultaneously reached by a plurality of selectors.

It is well known that in automatic telephone systems a plurality of selector switches have common access to a plurality of contacts which are tested by the wipers of the selectors in order to find and stop on one of these contacts which is marked as idle due to the presence of battery potential thereon.

It is also possible in such a system that the wipers of more than one selector may be caused to simultaneously step into engagement with one of these contacts, and that in such an event there is a possibility that both selectors might stop on this same contact and cause two connections to be extended to the same contact.

It is well known that the stopping relay of a battery searching selector, when operated, always serves to stop the searching operation. According to one feature of the invention, by connecting a non-linear resistor in series with the stopping relay, the characteristics of the non-linear resistor will render the stopping relay inoperative in case double connection occurs, so that the selector will continue to step on until an idle trunk is found or the eleventh rotary step is taken, as the case may be.

It is also well known that the non-linear resistors have the property of decreasing their D.-C. resistance with increasing current and increasing D.-C. resistance with decreasing current. According to the above feature of the invention, the insertion of such a resistor in series with the stopping relay achieves a unique purpose which will be briefly illustrated as follows:

In the selecting system, where one selector alone engages an idle outlet, a certain amount of current flows into the stopping relay of the selector so as to fully operate the relay and stop the searching operation.

Whereas, in the selecting system having a plurality of battery-searching selectors which have common access to a plurality of outlets, when two test wipers for the stopping relays of two selectors are simultaneously connected to the same idle contact, parallel test circuits are therefore completed at the same moment with the result that less current flows in each parallel circuit than would normally flow in one test circuit, where only a single selector engages an idle contact. Heretofore, with this decreasing current, the stopping relays still may pull up and cause a great inconvenience by the establishment of a double connection. In accordance with the present invention, the non-linear resistor, due to the decrease in current flow in each of the parallel test circuits of a double connection, further increases its resistance to cause further reduction of current flow in each of the parallel test circuits with the result that the stopping relays in these parallel test circuits are prevented from operating.

The above and various subordinate features of the invention are exemplified in the typical arrangement embodying the invention which will now be described with reference to the accompanying drawings in which.

Figure 2:
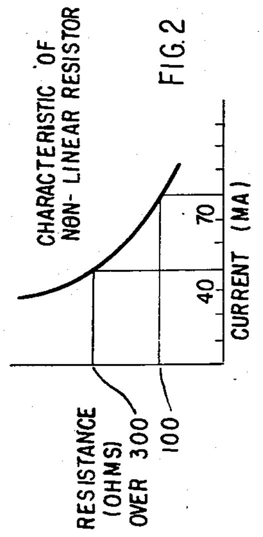
Fig. 2 is a graph showing that the resistance of the non-linear resistor varies inversely in accordance with the value of the current flowing therethrough.

Referring now to Fig. 2, the non-linear resistor which has a resistance of 100 ohms at 70 ma. and 300 ohms at 40 ma., may consist of silicon carbide and silicon resin with a special heat treatment according to a well known process.

Figure 1:
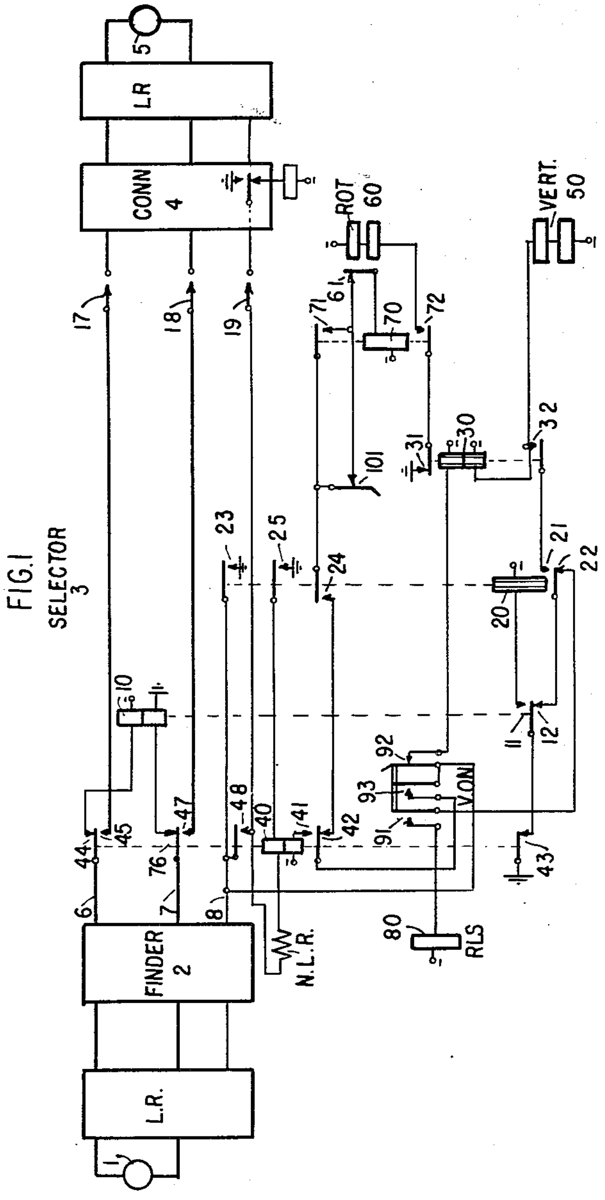
Fig. 1 is a circuit diagram showing the invention as applied to a selecting switch.

Referring now to Fig. 1, the automatic telephone system illustrated incorporates therein the features of the applicant's selector circuit and includes a substation, finder switch, battery searching selector circuit, connector and a second substation.

The selector circuit is connected to the finder 2 by conductors 6, 7 and 8 and is adapted to be controlled by operating impulses transmitted by subscriber 1 in a well known manner to position the wipers 17, 18 and 19 opposite a desired group of bank contacts connected by trunk lines to connectors such as 4 which in turn have access to subscribers such as 5. Essentially the battery searching selector circuit consists of a well known Strowger vertical and rotary switch having off normal springs 91, 92 and cam springs 101 used in conjunction with a circuit including a line relay 10, a hold relay 20, a changeover relay 30, a stop relay 40, a vertical magnet 50, a motor magnet or a rotary magnet 60, a stepping relay or a rotary pulsing relay 70, release magnet 80, their associated contacts and connections.

For explanatory purposes, it will now be assumed that calling subscriber 1 wishes to extend a connection to subscriber 5. On removal of the receiver, a connection is initiated through finder 2 in a well known manner over conductors 6, 7 and 8 to selector 3. Assuming that selector 3 is not busy, a circuit is completed for line relay 10, which energizes and completes a circuit for relay 20 from ground over contacts 43 and 11. Relay 20 energizes and at contacts 21 prepares a circuit for the vertical stepping magnet 50, at contacts 22 breaks a point in the circuit to release magnet 80, at contacts 23 places ground on conductor 8 to maintain finder 2 operated and prepare a circuit for rotary pulsing relay 70 through the off normal springs 93 which are open at this point and completes a circuit to changeover relay 30 from ground over contacts 23 and off normal springs 92. Relay 20 closes a further point in the rotary pulsing relay circuit at its contacts 24 and at contacts 25 applies ground to the battery searching wiper 19 through the winding of relay 40 and a non-linear resistor N. L. R. Relay 30 is energized and at its contacts 31 opens a point in the circuit for rotary magnet 60 and at contacts 32 closes another point in the circuit for vertical magnet 50. The selector is now prepared for the transmitted impulses from subscriber 1, relays 10, 20 and 30 being in the energized condition.

On receipt of the break of the first impulse, line relay 10 de-energizes and relays 20 and 30, having slow to release characteristics, remain operated for the series of impulses. Line relay 10 at its contacts 11 breaks the operating circuit to relay 20 and at its contacts 12 completes a circuit from ground over contacts 43, 12, 21 and 32 to the vertical magnet 50 and the lower winding of relay 30. In operating, the vertical magnet 50 elevates the wipers 17, 18 and 19 one step whereby they are positioned in the well known manner opposite the first level of bank contacts in the associated contact field. Assuming a series of five impulses were sent as the first digit by subscriber 1, the wipers will be operated to a position opposite the fifth level of bank contacts in the associated contact field. Incident to the first vertical step of the wipers in response to the first operation of vertical magnet 50, the vertical off normal springs 92 are opened and springs 91 and 93 are closed. The springs 92 open the operating circuit of changeover relay 30 which now holds over an operating circuit from ground over contacts 43, 12, 21 and 32. The off normal springs 91 prepares a circuit for the release magnet 80 and the off normal springs 93 complete a circuit for changeover relay 70 from ground over contacts 23, off normal springs 93, contacts 42 and 24, cam springs 101 and contacts 61. Relay 70 operates and at contacts 71 short circuits the cam springs 101 in its operating circuit and at contacts 72 prepares a circuit for rotary magnet 60.

At the end of the first digit dialed by subscriber 1, relays 10 and 20 are maintained energized and relay 30 after a short interval releases, its holding circuit being broken by relay 10 at its contacts 12. Relay 30 on restoring, breaks the operating circuit for vertical magnet 50 at its contacts 32, and at its contacts 31 energizes the rotary magnet 60 from ground over contacts 31 and 72. Rotary magnet 60 energizes and operates to rotate the wipers 17, 18 and 19 into engagement with the contacts forming the first contact set of the fifth level selected by the vertical magnet. Rotary magnet 60 on energizing interrupts the operating circuit for rotary pulse relay 70. Relay 70 releases and at contacts 71 further breaks its own operating circuit, and at contacts 72 opens the operating circuit for magnet 60. Contacts 61 of rotary magnet 60 reclose the operating circuit for relay 70 from ground over contacts 23, off normal springs 93, contacts 42 and 24, cam springs 101 and contacts 61. The succeeding operations are dependent upon the idle or busy condition of the first connector thus selected in the selected group of connectors. If this connector is busy, the test conductor thereof terminating in the usual test bank contact accessible to test wiper 19 is marked with ground potential in the well known manner so that the upper winding of relay 40 connected to the test wiper 19 is short circuited to ground over contact 25. Relay 70 continues to operate as long as relay 40 is not energized and at contacts 71 closes its own holding circuit and at contacts 72 closes afore-traced circuit for rotary magnet 60. Rotary magnet 60 re-operates and advances the selector wipers a second step. The rotary step-by-step movement of the wipers continues until an idle connector is located, or the wipers 17, 18 and 19 are driven step-by-step in a clockwise direction to the eleventh step whereupon cam springs 101 are operated to the open position in a well known manner. The opening of cam springs 101 opens the energizing circuit to relay 70 and prevents further operation of same.

When a connector terminating in the bank accessible to wiper 19 is idle, its test conductor is marked with negative battery potential through a resistance in the well known manner as indicated in connector 4. Assuming the selector has engaged an idle connector, battery is connected through the resistance over the bank contact in connector 4, test wiper 19, the non-linear resistor N.L.R., the upper winding of relay 40, contact 25 and ground. It may be mentioned at this point that the non-linear resistor has a normal value of resistance for a given current flow for effectively operating relay 40 in case the selector engages an idle connector. Relay 40 operates and arrests the trunk hunting operation by breaking the previously traced operating circuit to relay 70, which, in turn, prevents re-operation of relay 70 and consequent operation of rotary magnet 60 and thereby prevents further rotary movement of the selector. Relay 40 and its contacts 41 completes a self-holding circuit for itself over off normal springs 93, and contacts 23 to ground, at contacts 43 opens the operating circuit for slow to release relay 20 and release relay 80, and at contacts 44 and 46 disconnects the incoming connections of conductors 6 and 7 to line relay 10 and at contacts 45 and 47 connects the conductors through the wipers 17 and 18 to the connector 4 selected, whereupon the relays therein corresponding to relays 10 and 20 in selector 3 energize to prepare the connector 4 for operation and to place a ground potential extending from make contacts in connector 4, as illustrated, to the test bank contact engaged by test wiper 19 similar to the manner in which relay 20 in selector 3 places a ground on conductor 8 at contacts 23. Relay 20 de-energizes after an interval and breaks the holding circuit to finder 2 at its contacts 23. The finder 2 is now held over contacts 48 and conductor 8 by the ground placed on wiper 19 by connector 4, and the stop relay 40 is held by the same ground over conductor 19, contacts 48, off normal springs 93, contacts 41 and the lower winding of relay 40. Relay 40 is therefore the only energized relay at this time.

When the call is completed and the receivers replaced, ground is removed from conductor 19 by connector 4 whereupon relay 40 and finder 2 release.

A circuit is completed from ground over contacts 43, 12, 22 and off normal springs 91 for release magnet 80, whereupon the restoration of the selector is brought about in the usual manner.

The foregoing describes the ordinary operation of a battery searching selector in completing a single connection in an automatic telephone system. In previous battery searching selectors, a double seizure is apt to occur when two selector switches having access to the same group of trunks start to hunt for an idle trunk simultaneously or nearly simultaneously. It may be stated that if the two selectors start to hunt exactly together it is possible that they will seize the same trunk, unless there is considerable difference in the adjustment of the relays.

In order to explain how a double seizure occurs to standard selectors, it will now be assumed that selector 3 and another similar selector 3′ (not shown) without non-linear resistors connected in their test circuits, but both having access to the same group of trunks start to hunt for an idle trunk simultaneously. The initiation of the hunting action is, of course, caused by the de-energization of the relay 30 of selector 3 and a similar relay 30′ of selector 3′ (not shown). The rotary magnets 60 of selector 3, and 60′ of similar selector 3′ (not shown) will therefore be energized simultaneously and it will be assumed that the stepping relays 70 of selector 3 and 70′ of another selector 3′ de-energize simultaneously. If the rotary magnets now fall back together, the test circuits of the selector 3 and the test circuit of a similar selector 3′ (not shown) will be closed simultaneously. Both selectors, therefore, engage the same outlet through its test wipers and accordingly, the stopping relays 40 and 40′ (not shown) will start to pull up simultaneously. If there is not too great difference in adjustment of the stopping relays 40 and 40′, they will pull up substantially together and double seizure has thus taken place.

The effect of adding a non-linear resistor, according to this invention, will now be discussed and the operation thereof will be explained. As already pointed out, the non-linear resistors have the property of decreasing their D.-C. resistance with increasing current. In testing the selectors with a non-linear resistor included in their circuits, double seizure would not occur even under the condition of releasing the changeover relays 30 and 30′ (not shown) exactly together. In testing this circuit arrangement, as afore-mentioned, two selectors such as 3 and 3′ (not shown) may be given access to the same group of trunks, and a special arrangement may be added for breaking the circuits of the changeover relays 30 and 30′ simultaneously in order to start the switches in hunting operation, the switches having been previously raised by hand to the same level. Tests have been made in this way both with and without the non-linear resistor and these tests have been made under the condition of releasing both changeover relays simultaneously and under varying conditions in which the release of one changeover relay is permitted to lag a varying amount of time behind the other changeover relay. These tests show that with the non-linear resistor included, it is very difficult to obtain a double seizure.

It is, therefore, certain that the addition of the non-linear resistor renders the stopping relay completely inoperative in the event of double connection when this relay is trying to pull up to seize a trunk. In the meantime the stepping relay will pull up and cause the motor magnet to drive the switch on to another trunk, since contacts 42 has not yet opened and the operating circuit to the stepping relay 70 still remains closed.

While a particular embodiment of the invention has been described, it will be understood that various modifications may be made therein which are within the true spirit and scope of the invention.

What is claimed is:

1. In a selecting system, a plurality of stepping switches, lines accessible to said switches, means for automatically stepping said switches to hunt for idle ones of said lines, means in each switch effective in case two of said switches start to hunt simultaneously for preventing the seizure of the same idle line, said means including a test circuit having a stopping relay and a non-linear resistor connected in series in each said switch, one of said non-linear resistors permitting a current to flow in one of said stopping relays in one of said switches sufficient to thereby operate said relay in series with said resistance in case said one switch alone engages an idle one of said lines to seize said one idle line, and said resistor in each of said switches having characteristics such that its resistance to current flow is greater when said two switches simultaneously engage the same idle line to thereby permit a lesser amount of current to flow in each relay to thereby prevent operation of the stopping relays on double connections to the same idle line.

2. In a selecting system, a plurality of stepping switches, each stepping switch comprising a stepping relay, a motor magnet and an operating circuit for said stepping relay, lines accessible to said switches, means including said motor magnet and said stepping relay for automatically stepping said switches to hunt for idle ones of said lines, means in each switch effective in case two of said switches start to hunt simultaneously for preventing the seizure of the same idle line, said means including a test circuit having a test wiper, a stopping relay and a non-linear resistor connected in series in each said switch, said non-linear resistor having a normal value of resistance for a given current flow of one value for effectively operating said stopping relay in case said test wiper alone engages an idle line, contacts on said stopping relay for opening said operating circuit of said stepping relay in response to the operation of said stopping relay to thereby prevent further operation of said stepping relay and said magnet, said resistor always providing a current path but having characteristics causing it to increase it resistance in said test circuit to thereby cause a reduced current to flow in said test circuit for rendering said stopping relay inoperative in case said wiper and a similar wiper of another selector simultaneously engage the same idle line.

3. In a selecting system having a plurality of selectors with outlets accessible in common to the test wipers of said selectors, each outlet having a test terminal associated therewith having a potential connected thereto through a resistance when the outlet is idle, means for operating said selectors to cause the wipers thereof to engage the various test terminals of said outlets to test for idle ones thereof, a test circuit including the test wiper of each selector and a stopping relay therein completed when a test wiper engages an idle terminal, said stopping relay operated by said potential to stop the associated selector on said outlet, a non-linear resistor also included in each test circuit, each said resistor having a continuously increasing resistance with decrease in current flow therethrough permitting sufficient current to flow in a test circuit when only one wiper engages a contact to thereby energize the stopping relay therein, but effective to increase its resistance with the lesser current flow in each of a plurality of test circuits which are completed when a plurality of test wipers engage a test terminal to thereby permit only a lesser amount of current flow and prevent the operation of any stopping relay.

References Cited in the file of this patent

UNITED STATES PATENTS

| | | |
|---|---|---|
| 2,529,409 | Newstedt | Nov. 7, 1950 |
| 2,576,097 | Bray et al. | Nov. 27, 1951 |
| 2,673,246 | Lesigne | Mar. 23, 1954 |